(12) United States Patent
Sakayori et al.

(10) Patent No.: US 7,063,758 B2
(45) Date of Patent: Jun. 20, 2006

(54) LAMINATING APPARATUS AND LAMINATING METHOD

(75) Inventors: Toshimasa Sakayori, Tokyo (JP); Kenichi Horie, Tokyo (JP); Takashi Sugio, Tokyo (JP); Takehito Miura, Tokyo (JP); Yuichi Iwase, Tokyo (JP); Yasunori Kijima, Tokyo (JP)

(73) Assignees: Three Bond Co., Ltd., Tokyo (JP); Sony Corporation, Tokyo (JP)

( * ) Notice: Subject to any disclaimer, the term of this patent is extended or adjusted under 35 U.S.C. 154(b) by 333 days.

(21) Appl. No.: 10/206,834

(22) Filed: Jul. 29, 2002

(65) Prior Publication Data

US 2004/0016506 A1 Jan. 29, 2004

(51) Int. Cl.
*B32B 31/12* (2006.01)

(52) U.S. Cl. .................. 156/87; 156/291; 156/295; 156/290

(58) Field of Classification Search ............. 156/87, 156/295, 286, 153, 154, 67, 291, 285, 98, 156/564, 583.3, 576, 569; 437/220; 428/68, 428/69, 76; 313/498, 499, 484, 502; 315/169.3; 345/44–50, 36, 82, 76; 269/21; 438/99
See application file for complete search history.

(56) References Cited

U.S. PATENT DOCUMENTS

| 4,428,793 | A | * | 1/1984 | Sato et al. ............ 156/285 |
| 4,470,858 | A | * | 9/1984 | McMaster ............ 156/103 |
| 4,853,079 | A | * | 8/1989 | Simopoulos et al. ........ 216/25 |
| 5,187,123 | A | * | 2/1993 | Yoshida et al. ........... 156/295 |
| 5,346,569 | A | * | 9/1994 | Simon .................. 156/87 |
| 5,445,692 | A | * | 8/1995 | Nitta ................... 156/87 |
| 5,854,664 | A | * | 12/1998 | Inoue et al. ............ 349/92 |
| 5,942,062 | A | * | 8/1999 | Hassall et al. ........... 156/87 |
| 5,944,947 | A | * | 8/1999 | Broomhall et al. ........ 156/228 |
| 6,066,218 | A | * | 5/2000 | Kuhn et al. ............ 156/87 |
| 6,382,693 | B1 | * | 5/2002 | Ljungmann ............. 294/64.1 |
| 6,808,576 | B1 | * | 10/2004 | Shimizu et al. .......... 156/87 |

FOREIGN PATENT DOCUMENTS

| JP | 5-182759 | | 7/1993 |
| JP | 11283739 A | * | 10/1999 |
| WO | WO 200037986 A1 | * | 6/2000 |

* cited by examiner

*Primary Examiner*—Jeff H. Aftergut
*Assistant Examiner*—Chris Schatz
(74) *Attorney, Agent, or Firm*—Lowe Hauptman & Berner, LLP

(57) ABSTRACT

A method of laminating first and second members to each other includes the steps of applying a resin material to a plurality of regions on the laminating surface of at least one of the first and second members such that an air escape passage extending in a predetermined direction is formed; providing a laminating force to the first and second members along the extending direction of the air escape passage in a state where the first and second members are disposed with their laminating surfaces opposed to each other, so that air is expelled toward the outside through the air escape passage and the applied resin material is made to be continuous so as to form a thin film layer; and then laminating the first and second members to each other.

2 Claims, 11 Drawing Sheets

LAMINATING APPARATUS AND LAMINATING METHOD

BACKGROUND OF THE INVENTION

1. Field of the Invention

The present invention relates to a laminating apparatus and a laminating method. More specifically, the present invention relates to a laminating apparatus and a laminating method for, when first and second members each having a predetermined laminating surface are laminated to each other, preventing air bubbles from remaining between the members.

2. Description of Related Art

Conventionally, there is known an organic electroluminescent device configured by containing an organic electroluminescent light emitting portion constituted by various kinds of electrodes and organic electroluminescent material and the like. An example of an organic electroluminescent device is one having a structure proposed in Japanese Patent Application Laid-Open No. 5-182759. In this organic electroluminescent device, in order to reduce the thickness of the entire structure while protecting the organic electroluminescent light emitting portion, a sealing glass is laminated via a photo-curing resin onto a device substrate formed by stacking the organic electroluminescent light emitting portion onto a glass substrate. In this case, the lamination of the sealing glass is generally carried out in the following manner. A photo-curing resin is applied onto an entire or a part of the laminating surface of the device substrate into a uniform thickness. Then, a sealing glass held in a substantially horizontal state is placed and pressed onto the laminating surface of the device substrate.

However, in the above-described lamination of the sealing glass onto the organic electroluminescent device, when the sealing glass is brought into contact with the photo-curing resin at the first time, they are in surface-contact with each other. Therefore, air is likely to enter between the photo-curing resin and the sealing glass. The air that enters at this time does not easily escape outside even if the sealing glass is pressed toward the device substrate side. As a result, defective products with the air bubbles remaining therein are easily produced. Particularly, in recent years, there is a demand for large-sized organic electroluminescent devices. In the large-sized organic electroluminescent devices, air is more likely to enter between the photo-curing resin and the sealing glass, and the disadvantage as described above becomes more conspicuous. In addition, an organic electroluminescent device is also known where a light can be emitted from an organic electroluminescent light emitting portion toward the opposite side of the glass substrate. In this structure, an image display surface produced by the light emitted from the organic electroluminescent light emitting portion is provided on the surface of the sealing glass. In this case, if the air bubbles exist on the image display surface, there is also a disadvantage in that the image quality of the image display surface is deteriorated, resulting in significantly decreasing the value of the product.

SUMMARY OF THE INVENTION

In view of the foregoing disadvantages, it is an object of the present invention to provide a laminating apparatus and a laminating method capable of laminating first and second members each other each having a predetermined laminating surface without leaving air bubbles therebetween.

In order to achieve the above-described object, a laminating apparatus according to an aspect of the present invention is a laminating apparatus for laminating first and second members to each other each having a predetermined laminating surface via a predetermined resin material, includes: applying means for applying the resin material to a plurality of portions on the laminating surface of at least one of the first and second members such that an air escape passage extending in a predetermined direction is formed between the first and second members, when the first and second members are laminated; and laminating means for laminating the first and second members to each other after the resin material is applied. The laminating means expels the air toward outside through the air escape passage when providing a laminating force to the first and second members along the extending direction of the air escape passage, and laminates the first and second members to each other in a state where the applied resin material is made to be continuous so as to form a thin film layer. According to the structure described above, when the first and second members are laminated to each other, the air remaining inside can escape toward outside through the air escape passage. As a result, the first and second members can be laminated to each other without leaving air bubbles therebetween. In this case, the first member is a device substrate formed with an organic electroluminescent light emitting portion including various kinds of electrodes and an organic electroluminescent material, whereas the second member is a protective plate for sealing the resin material. In addition, the applying means is capable of applying the resin material onto the laminating surface of the device substrate.

Further, a laminating method according to an aspect of the present invention, the method of laminating first and second members to each other each having a predetermined laminating surface via a predetermined resin material, includes the steps of: applying the resin material to a plurality of portions on the laminating surfaces of at least one of the first and second members such that an air escape passage extending in a predetermined direction is formed; and providing a laminating force to the first and second members along the extending direction of the air escape passage in the state where the first and second members are disposed with their laminating surfaces opposed to each other, so that the air is expelled through the air escape passage toward outside and also the applied resin material is made to be continuous so as to form a thin film layer, and then laminating the first and second members to each other. By means of this method, the above-described object can also be achieved.

According to a preferred form of the aspect of the present invention, a structure is also employed in which the applying means is capable of applying the resin material into a shape of bead at a predetermined interval, and the air escape passage is formed between each of the beads. Due to this structure, it is possible to prevent air bubbles from entering between the first and second members after they are laminated to each other through a relatively simple step of applying the resin material.

It is preferable that each bead as described above is kept in a shape of dome when viewed in a cross-sectional direction substantially orthogonal to the extending direction thereof. The thus-shaped beads can be in substantially point-contact with the other laminating surface of at least one of the first and second members at a time of initial contact between the first and second members. Due to this arrangement, at the initial contact immediately after the laminating surfaces are brought into contact with each other, the contact area therebetween can be made small. As a result, the air does not easily enter between the first and second members, thereby preventing air bubbles from remaining therebetween. In addition, the laminating means further includes press force providing means that moves while pressing an outer surface of either one of the first and second members. By employing the structure that the press force providing means moves along the extending direction of the beads while pressing the one member against the other member among the first and second members, the air remaining between the first and second members can be reliably expelled toward outside. Herein, it is preferable that the laminating means further includes holding means capable of holding the one member, while one end of the one member is used as a base end, and the other end, which is a free end, of the one member is bent. In this structure, in accordance with the movement of the press force providing means, the one member is gradually laminated onto the other member from the base end toward the free end. Due to this arrangement, the air can be further reliably expelled toward outside. A structure may also be employed in which the holding means may is capable of holding the one member while changing a bending angle of the one member, and in accordance with the movement of the press force providing means the bending angel is gradually decreased. By this structure, the effects can be further enhanced.

The resin material (photo-curing resin) that can be used in the present invention is not particularly limited as far as it is a photo-curing resin. Examples of the resin material include: photo-radical polymerizable resins containing various kinds of (meth)acrylates such as polyester (meth)acrylate, polyether (meth)acrylate, epoxy (meth)acrylate, and polyurethane (meth)acrylate as main components; photo-cationic polymerizable resins containing resins such as epoxy and vinyl ether and the like as main components; thiol-en addition type resins, and the like. Among these photo-curing resins, the epoxy resin based photo-cationic polymerizable resins are preferable, because they provide a cured substance with low shrinking rate, produce only small amount of outgas, and are reliable for a long period of time.

The property of the photo-curing resin at the time when it is applied varies depending on the diameter of the nozzle of the applying means, the discharge amount through the nozzle, the material of the surface to be applied (surface tension), the kind of photo-curing resin, and the like. Preferably, the photo-curing resin should have a viscosity of about 3000 to 30000 cp. In addition, as preferable physical properties, the photo-curing resin after it is cured is required to have high optical transmittance (visible region) and to be colorless and transparent, when an organic electroluminescent panel or a liquid crystal display panel is employed as a device substrate. Specifically, when the cured resin forms a film with a thickness of 50 to 60 µm (as a cured substance made of photo-curing resin), its optical transmittance should preferably be 70% or higher (and more preferably be 80% or higher).

Further, since the cured substance of the photo-curing resin is filled between the device substrate and the protective plate so as to reinforce each other, it is preferable that the cured substance of the photo-curing resin should be firmly adhered to each of the substrate materials, as well as to have flexibility (rubber elasticity) so that it can absorb the deformation caused by an external stress. Specifically, the cured substance of the photo-curing material should preferably have a Shore A hardness of 30 to 60 measured by a hardness tester.

In addition, in this specification, the term "bead" means a resin material applied in a shape of continuous lines.

BRIEF DESCRIPTION OF THE DRAWINGS

FIG. 1(A) is an exploded perspective view of an organic electroluminescent device according to an embodiment of the present invention, whereas FIG. 1(B) is a schematic cross-sectional view of the organic electroluminescent device.

FIG. 8 is an enlarged front view of a main portion of the laminating apparatus showing a state in which the sealing glass adsorbed by the laminating apparatus is made to approach the device substrate in.

DETAILED DESCRIPTION OF THE INVENTION

Hereinafter, embodiments of the present invention will be described with reference to the drawings.

Figure 1:
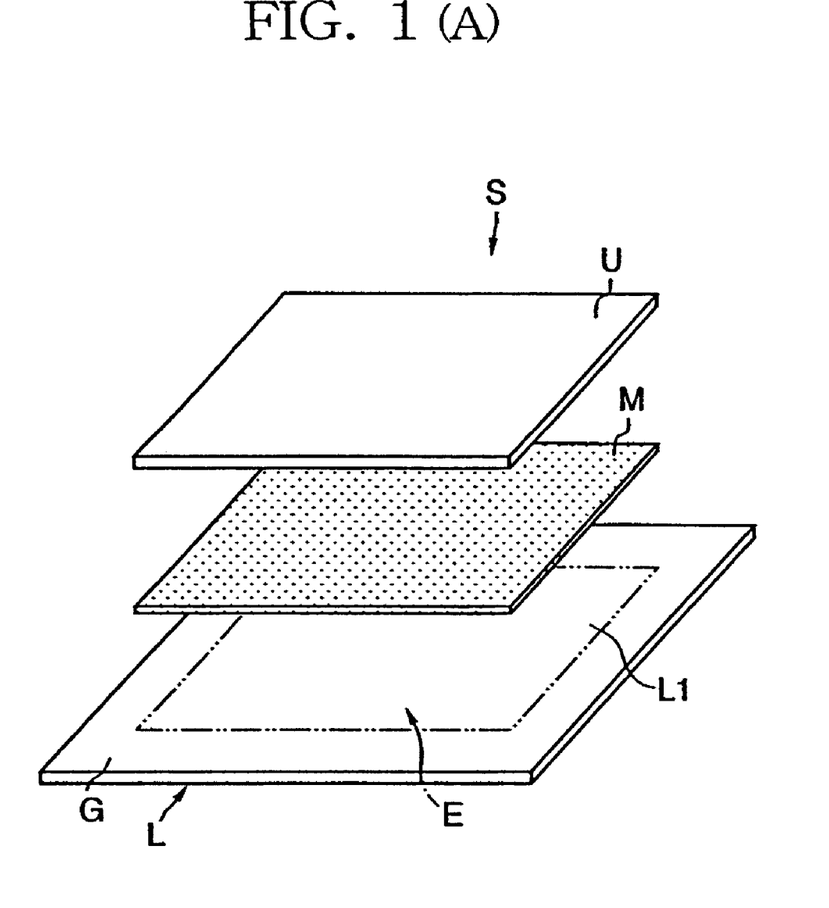

FIG. 1(A) is a schematic exploded perspective view of an organic electroluminescent device formed by a laminating apparatus according to the present embodiment. FIG. 1(B) is a schematic cross-sectional view of the organic electroluminescent device. In FIGS. 1(A) and 1(B), an organic electroluminescent device S includes: a device substrate L (a first member), as a light emitting body having a substantially square shape when viewed from the top, on which an organic electroluminescent light emitting portion E containing various kinds of electrodes and an organic electroluminescent material and the like; and a transparent and colorless sealing glass U (a second member) having a substantially square shape when viewed from the top and laminated onto a laminating surface L1, which is an upper surface of the organic electroluminescent light emitting portion E, via a resin material M (a photo-curing UV resin) for protecting the organic electroluminescent light emitting portion E.

Figure 2:
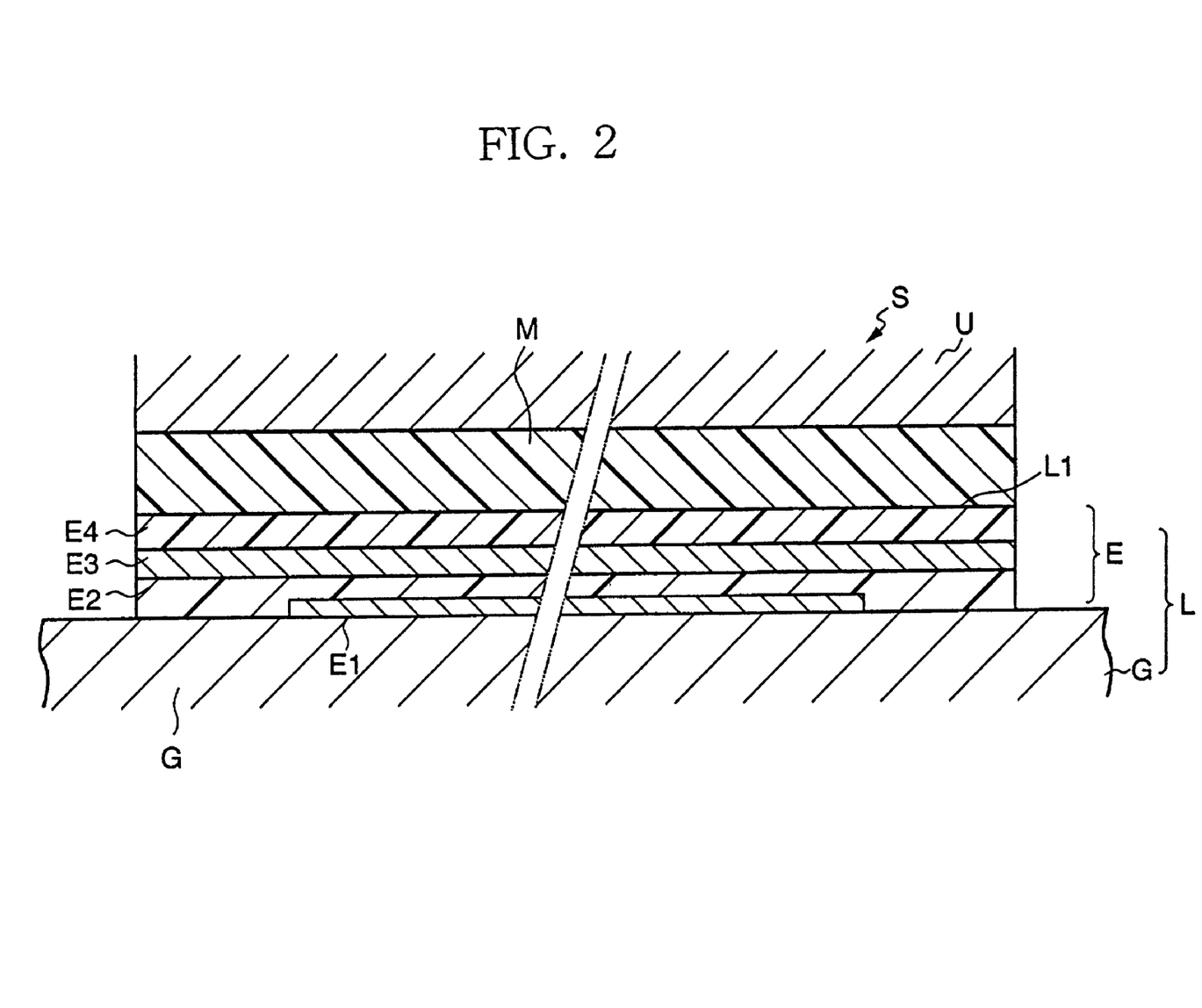
FIG. 2 is an enlarged cross-sectional view of the organic electroluminescent device.

The device substrate L is constituted by stacking the organic electroluminescent light emitting portion E onto the transparent and colorless glass substrate G, as shown in FIG. 2 in an enlarged state. The organic electroluminescent light emitting portion E, although not limited to this, is formed by sequentially stacking an opaque electrode E1, an organic layer E2 made of an organic electroluminescent material and the like, an electrode E3, and a protective layer E4 made of metallic or resin material and the like. Accordingly, in the organic electroluminescent device S of the present embodiment, the organic electroluminescent light emitting portion E emits a light toward the sealing glass U side, which is a reverse side of the glass substrate G, and the thus emitted light transmits the resin layer M and the sealing glass U and appears outside. Therefore, in the present embodiment, the upper surface side of the sealing glass U in FIG. 2 is used as an image display surface.

Figure 3:
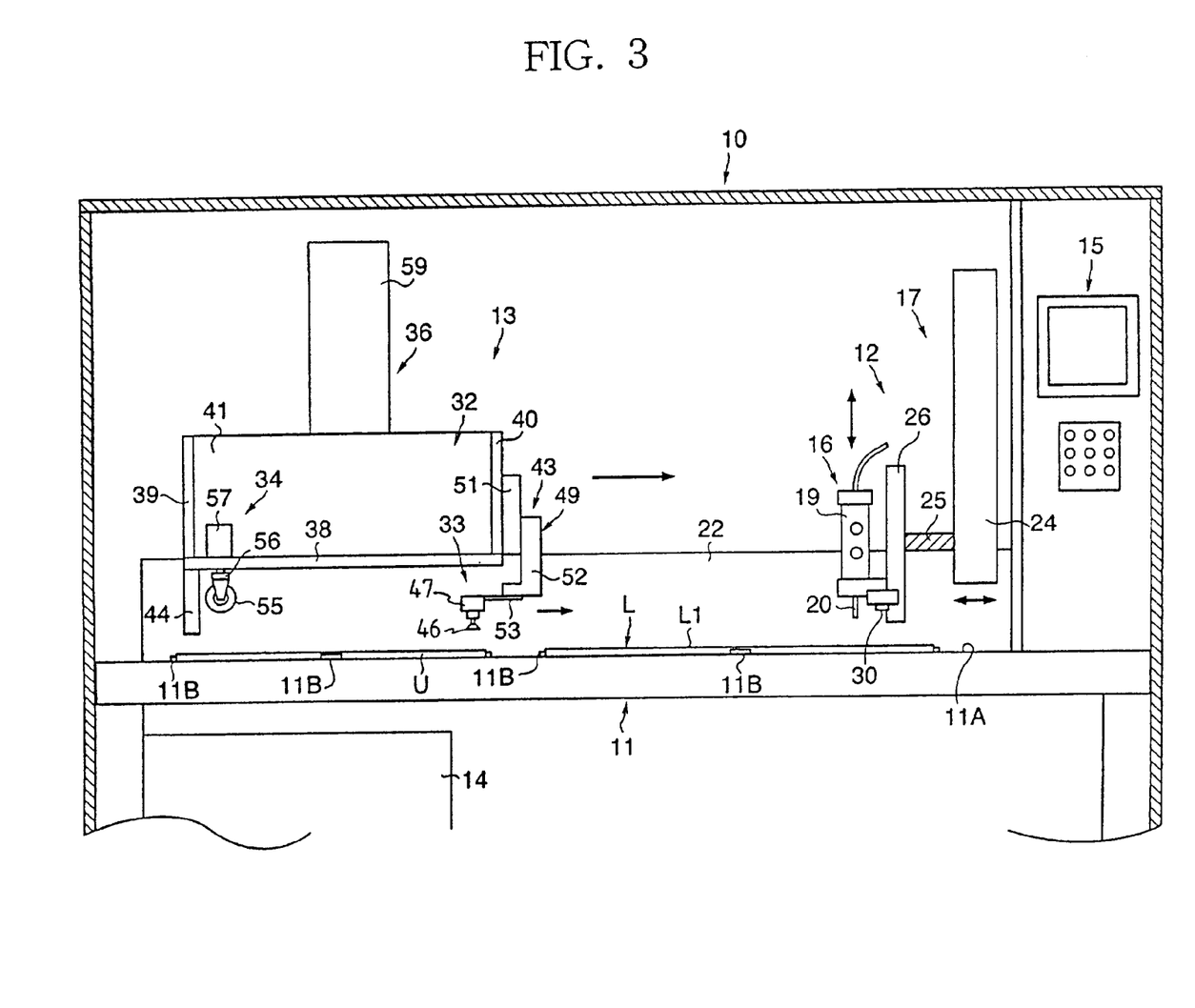
FIG. 3 is a schematic front view of a laminating apparatus according to an embodiment of the present invention.

The organic electroluminescent device S is formed by laminating the sealing glass U onto the laminating surface L1 of the device substrate L via the resin material M, by use of a laminating apparatus 10 schematically shown in FIG. 3. Hereinafter, the terms indicating positions or directions such as "front", "back", "left", "right", "upper" and the like refer to the positions or directions in FIG. 3 viewed from the front side, unless otherwise specified.

The laminating apparatus 10 includes: a mount table 11 for mounting the device substrate L and the sealing glass U; applying means 12, located above the mount table 11, for applying the resin material M partially onto the laminating surface L1 of the device substrate L placed on the mount table 11; laminating means 13 for laminating the sealing glass U onto the device substrate L onto which the resin material M has been applied by means of the applying means 12; and a control panel 14, installed in a space below the mount table 11, for controlling various kinds of operations of the applying means 12, the laminating means 13, and the like. In FIG. 3, the reference numeral 15 denotes an operation display section of the laminating apparatus 10, including a display, various kinds of indicators, and the like.

On the mount table 11, the device substrate L is placed in a right area of a top surface 11A thereof whereas the sealing glass U is placed in a left area of the same. At a plurality of portions outside the areas where the device substrate L and the sealing glass U are placed, claws 11B that can protrude from and retract into the top surface 11A by a control picking, not shown, is omitted are provided respectively. Protrusion and retraction of the claws 11B restricts the movement of the device substrate L and the sealing glass U within the above area where they are placed.

Figure 4:
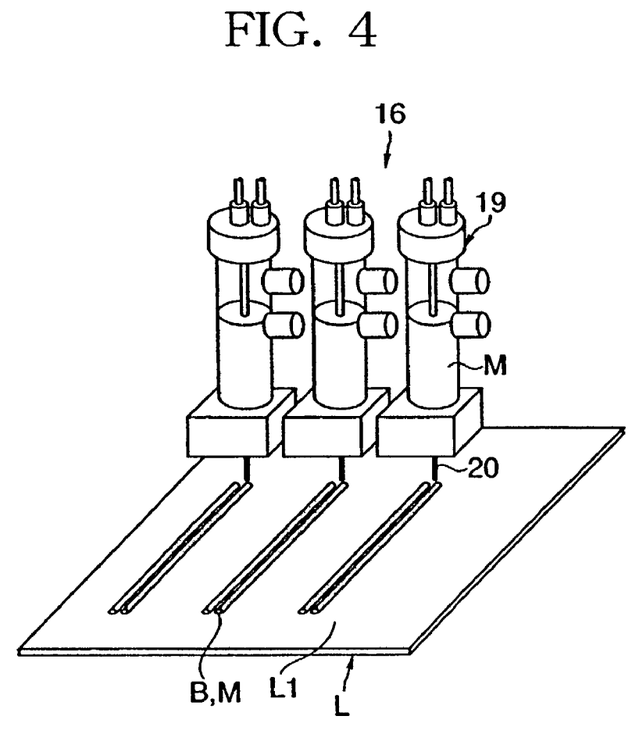
FIG. 4 is a schematic perspective view for illustrating the application of the resin material by use of a syringe device.

The applying means 12 includes: a syringe device 16 capable of discharging the resin material M; and syringe moving means 17 for moving the syringe device 16 along a predetermined track. The syringe device 16 includes: a syringe main body 19 structured so as to be capable of pressurizing the resin material M supplied from an unillustrated tank; and a nozzle 20 provided at a tip side of the syringe main body 19 and capable of discharging the resin material M contained in the syringe main body 19 in a shape of bead. In the present embodiment, three units of the syringe device 16 are provided along the direction orthogonal to the sheet on which FIG. 3 is drawn. Due to this structure, as shown in FIG. 4, three beads B can be formed simultaneously in accordance with the movement of the syringe devices 16. Viscosity of the resin material M is set to be a value at which the cross-sectional shape of each bead B before laminating the sealing glass U is kept to a shape along the outer shape of substantial dome thereof, as well as that no resin material M partially stays in the bead B. Herein, when the bead B is viewed from the cross-sectional direction substantially orthogonal to the extending direction thereof, a curvature of an upper portion of the bead B is determined so as to be capable of substantially being point-contact with the sealing glass U when at a time of initial contact thereof.

Figure 5:
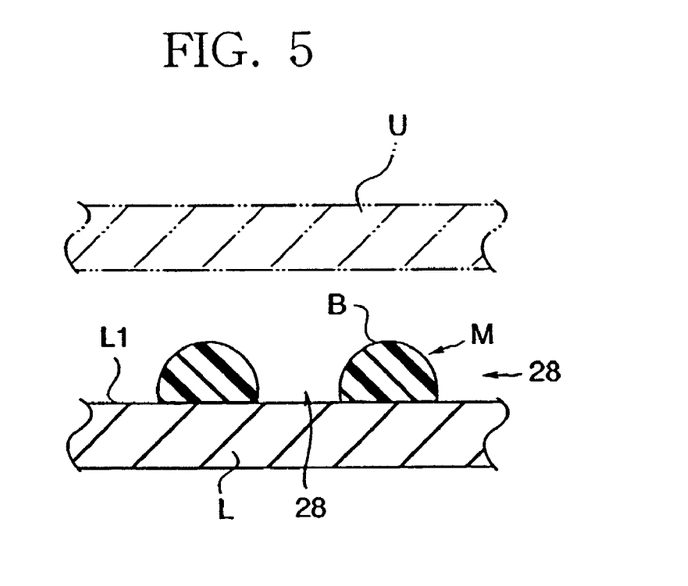
FIG. 5 is an enlarged cross-sectional view showing a device substrate on which a resin material is applied.

As shown in FIG. 3, the syringe moving means 17 is structured such that the syringe device 16 can be moved in three axial directions orthogonal to each other by a predetermined driving device. Specifically, the syringe moving means 17 includes: an X-axial direction movable body 24 which is movable in the left and right direction along a guide 22 extending in the left and right direction at a back side; a rail 25 in FIG. 2 fixed to the X-axial direction movable body 24 and extending in the orthogonal direction to the sheet on which FIG. 2 is drawn; and a Y-axial direction movable body 26 so as to be relatively movable in a direction the rail 25 extends and which supports the syringe device 16 in the upper and lower direction. The syringe moving means 17 can move the syringe device 16 such that a plurality of beads B in a shape of substantially straight line can be formed in the left and right direction at a predetermined interval on the laminating surface L1 of the device substrate L placed on the mount table 11. At this time, an air escape passage 28 (see FIG. 5) for allowing the air to escape outside when the sealing glass U is laminated is formed between each bead B. To the bottom end of the Y-axial direction movable body 26, a UV lamp 30 for curing the resin material M is attached.

The laminating means 13 includes: a substantially box-shaped support member 32 with front and upper surfaces thereof opened; holding means 33 which is supported by the support member 32 and can hold the sealing glass U by adsorbing it through a suction force generated by an unillustrated vacuum pump; press force providing means 34 which is supported by the support member 32 and can move in the left and right direction while pressing the outer surface of the sealing glass U; and support member moving means 26 which moves the support member 32 in the upper and lower direction and in the left and right direction.

The support member 32 includes: a bottom portion 38; side portions 39, 40 provided at both left and right ends of the bottom portions 38 respectively; and a back portion 41 located at a back side of the side portions 39, 40.

The holding means 33 includes: a first suction element such as a variable adsorbing device 43 which is located at a right end side of the bottom portion 38 and adsorbs an upper surface right end of the sealing glass U; and a second suction element such as an adsorbing block 44 which is fixed to the lower left end of the bottom portion 38 and adsorbs the upper left end of the sealing glass U.

Figure 6:
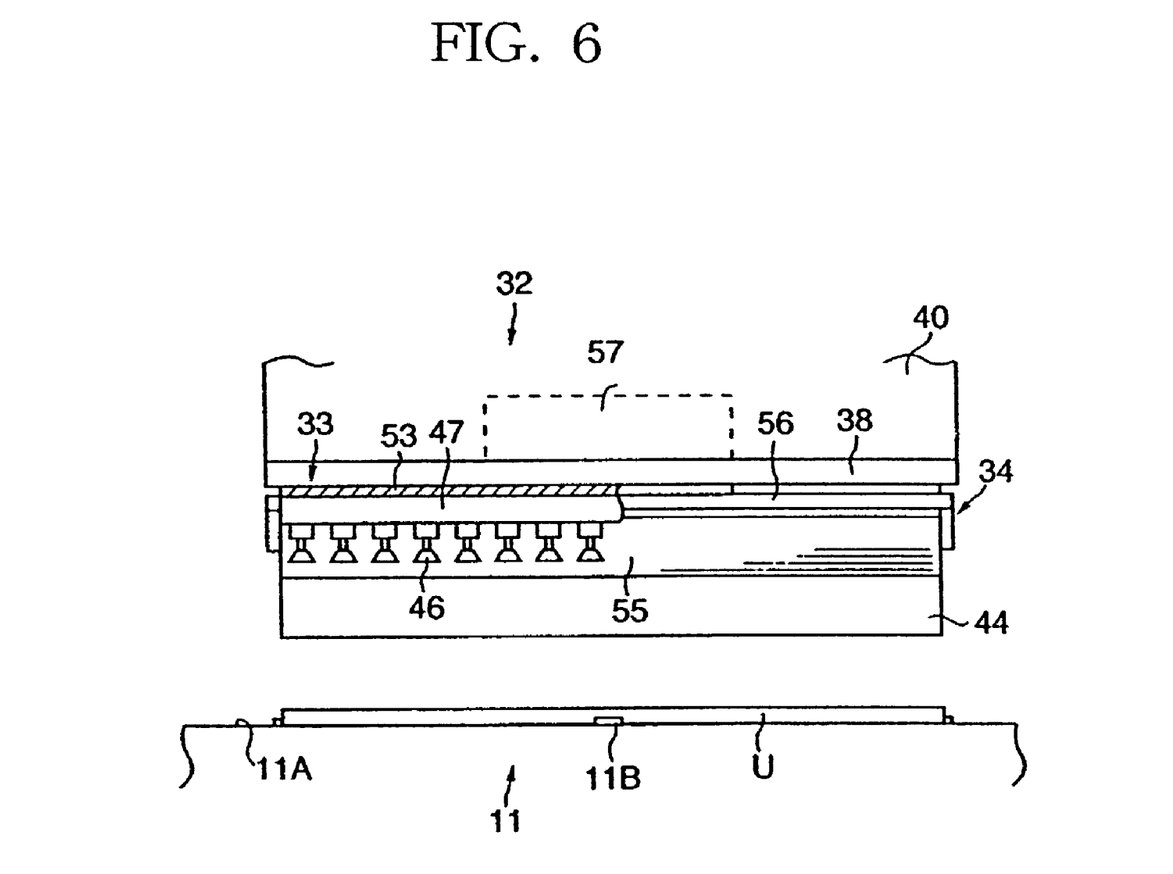
FIG. 6 is a side view showing a main portion of the laminating apparatus.

The first suction element or variable adsorbing device 43 includes: adsorbing pads 46 for adsorbing the sealing glass U; a main body portion 47 to which the adsorbing pad 46 is attached; and a two-axial moving mechanism 49 which allows relative movement of the adsorbing pad 46 and the main body portion 47 in the upper and lower direction and in the left and right direction with respect to the support member 32. A large number of the adsorbing pads 46 are provided in the direction orthogonal to the sheet on which FIG. 3 is drawn (see FIG. 6), and is supported by the main body portion 47 so as to be oscillatably movable in the upper and lower direction. The two-axial moving mechanism 49 includes: a fixed block 51 which is fixed to a side portion 40 at the right side thereof; a Z-axial direction movable body 52 which is attached to the fixed block 51 so as to be relatively movable in the upper and lower direction; and an X-axial direction movable body 53 which is attached to the bottom surface of the Z-axial direction movable body 52 so as to be relatively movable in the left and right direction and to which the main body portion 47 is fixed. The two-axial moving mechanism 49 is driven by a driving device (not shown) so that it can move each of the movable bodies 52, 53 in fixed directions at predetermined timing and speed. As a result of this, the adsorbing pad 46 and the main body portion 47 can move in the upper and lower direction and in the left and right direction with respect to the support member 32. Herein, the adsorbing pads 46 are provided such that adsorbing surfaces at the bottom end thereof are located at positions higher than the adsorbing surface at the bottom end of the adsorbing block 44 and are capable of ascending. Due to this structure, when a left end area of the sealing glass adsorbed by the adsorbing block 44 is used as a base end side, a free end side, which is a right end area of the sealing glass U adsorbed by the adsorbing pads 46, can be bent upward. At this time, this bending angle changes as the adsorbing pads 46 ascends and descends.

The press force providing means 34 includes: a crimp roller 55 which is located between the variable adsorbing device 43 and the adsorbing block 44 and extends in a direction orthogonal to the sheet on which FIG. 2 is drawn; a roller supporting member 56 for rotatably supporting the crimp roller 55; and a cylinder 57 for moving the roller supporting member 56 and the crimp roller 55 to upward and downward. The crimp roller 55 is structured so as to be moved from the wait position above the sealing glass U adsorbed and held by the adsorbing block 44 and the adsorbing pads 46 so as to be brought into contact with the upper surface of the sealing glass U; and is also structured so as to be capable of providing a predetermined force to the sealing glass U from the above in the process of laminating the sealing glass U to the device substrate L. In addition, the crimp roller 55 is movable together with the cylinder 57 in the left and right direction along the bottom portion 38 of the support member 32. Due to this arrangement, the press position on the sealing glass U can be changed in the left and right direction.

The support member moving means 36 is structured such that it can simultaneously move the support member 32, the holding means 33 and the press force providing means 34 at predetermined timings in the upper and lower direction or in the left and right direction by use of an unillustrated driving device and the like. The present embodiment employs a structure where the support member 32 is attached to the X-axial direction movable body 59 which is movable in the left and right direction along the guide 22, such that the support member 32 is relatively movable in the upper and lower direction.

Next, a method of laminating the sealing glass U to the device substrate L by use of the laminating apparatus 10 according to the present invention will be described referring to FIG. 3 and FIGS. 7 to 16, and the like.

First, as shown in FIG. 2, the device substrate L is placed in the right area on the top surface 11A of the mount table 11 in a state where its laminating surface L1 is faced upward.

On the other hand, the sealing glass U is placed in the left area on the top surface 11A of the mount table 11 and the craws 11B protrude and retract to restrict movement of the device substrate L and the sealing glass U in the surface direction. In this state, the application of the resin material M by the applying means 12 is started. Specifically, movement of the syringe device 16 by the syringe moving means 17 allows the tip of the nozzle 20 to face one end of the laminating surface L1 in the left and right direction, thereby starting the injection of the resin material M. As a result of reciprocal movement of the syringe device 16 in the left and right direction, a large number of beads B (see FIG. 4) in a shape of substantially straight line extending in the same direction are formed at a predetermined interval on the laminating surface L1. At this time, the applying amount of the resin material M, the length and pitch of the beads B, and the like can be arbitrarily set. This makes it possible to arbitrarily control the thickness and the like of the resin layer after the device substrate L and the sealing glass U are laminated to each other. After the application of the resin material M is finished, the applying means 12 as a whole moves to the back side of the apparatus so as to form a space where the laminating means 13 can be located.

Figure 7:
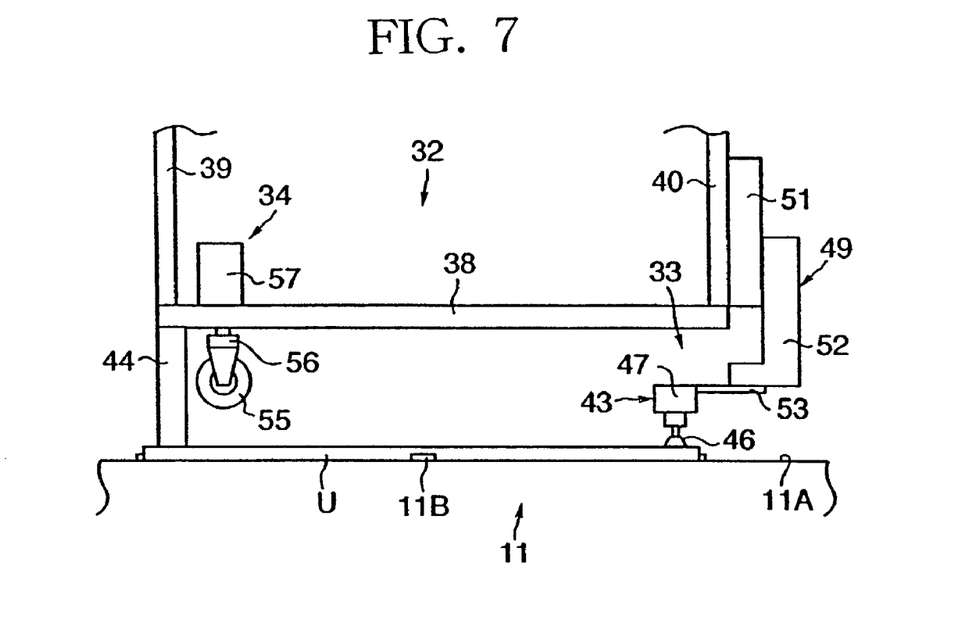
FIG. 7 is an enlarged front view of a main portion of the laminating apparatus showing a state in which it adsorbs a sealing glass in the laminating apparatus.
Figure 8:
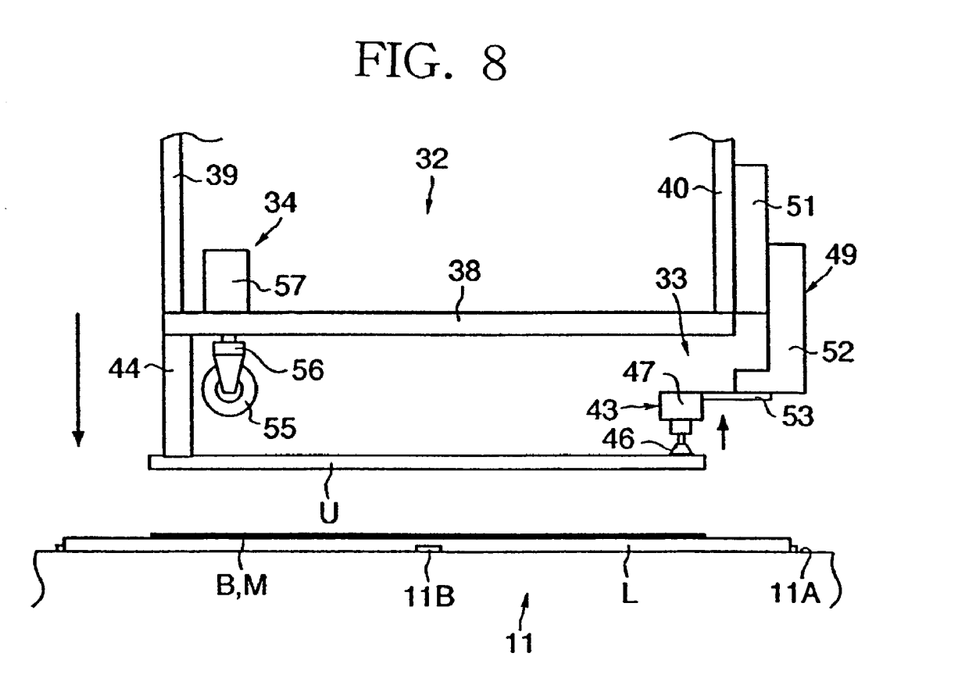
Figure 9:
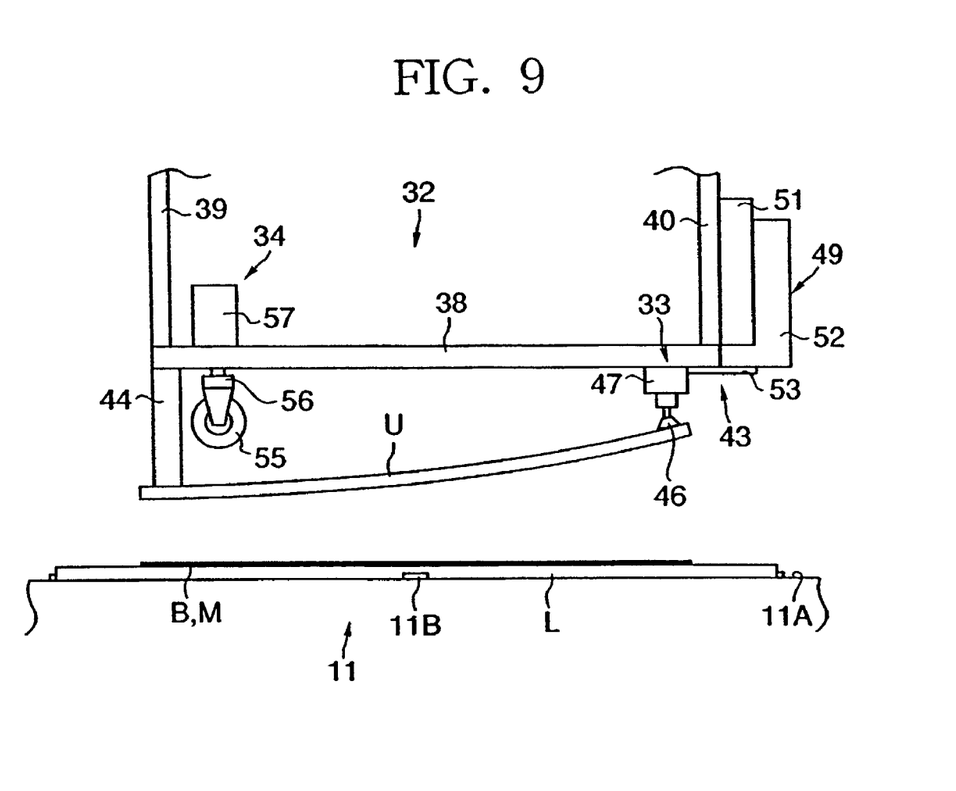
FIG. 9 is an enlarged front view of a main portion of the laminating apparatus showing a state where the sealing glass is bent by the laminating apparatus.
Figure 10:
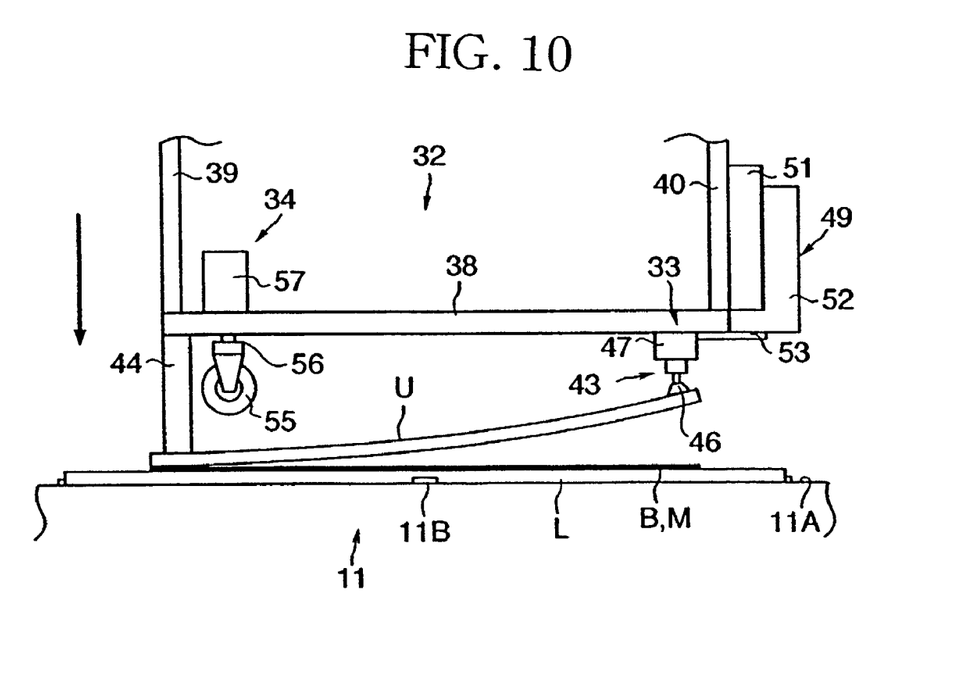
FIG. 10 is an enlarged front view of a main portion of the laminating apparatus showing a state where a part of the sealing glass is brought into contact with the device substrate.
Figure 11:
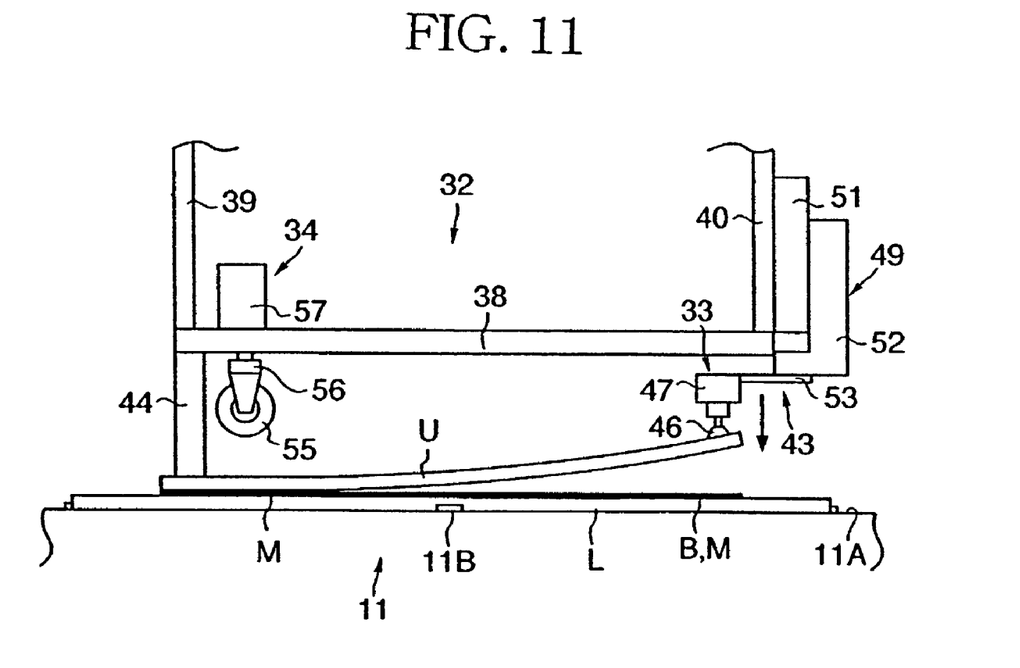
FIG. 11 is an enlarged front view of a main portion of the laminating apparatus showing a state where the contact area of the sealing glass with the device substrate is enlarged.

Next, lamination of the sealing glass U by the laminating means 13 is performed. First, the support member 32 descends from the state shown in FIG. 3. Then, as shown in FIG. 7, the adsorbing block 44 and the adsorbing pads 46 adsorb the sealing glass U located below the support member 32. The support member 32 as a whole ascends from this state, and as a result, the sealing glass U is lifted above the mount table 11. The support member 32 moves to the right while the state where the sealing glass U is lifted above the mount table 11 is kept. Then, as shown in FIG. 8, the support member 32 has reached a position which is above the resin material M applied onto the device substrate L. Simultaneously, or before or after the support member 32 reaches this position, as shown in FIG. 9, the adsorbing pads 46 ascends with respect to the adsorbing block 44 while the adsorbing pads 46 adsorb the sealing glass U. As a result, as a left end area of the sealing glass U at the adsorbing block 44 becomes a base end, the sealing glass U is held in a state where a free end of the adsorbing pads 46 is bent upward. From this state, the support member 32 further descends as shown in FIG. 10 to firstly bring the left end area of the sealing glass U into contact with the resin material M. At this time, as shown in FIG. 11, the adsorbing pads 46 slightly descends with respect to the adsorbing block 44. As a result of this movement, the contact area between the sealing glass U and the resin material M is slightly enlarged toward the right side, and the resin material M located below the crimp roller 55 is pressed to be flattened.

Figure 12:
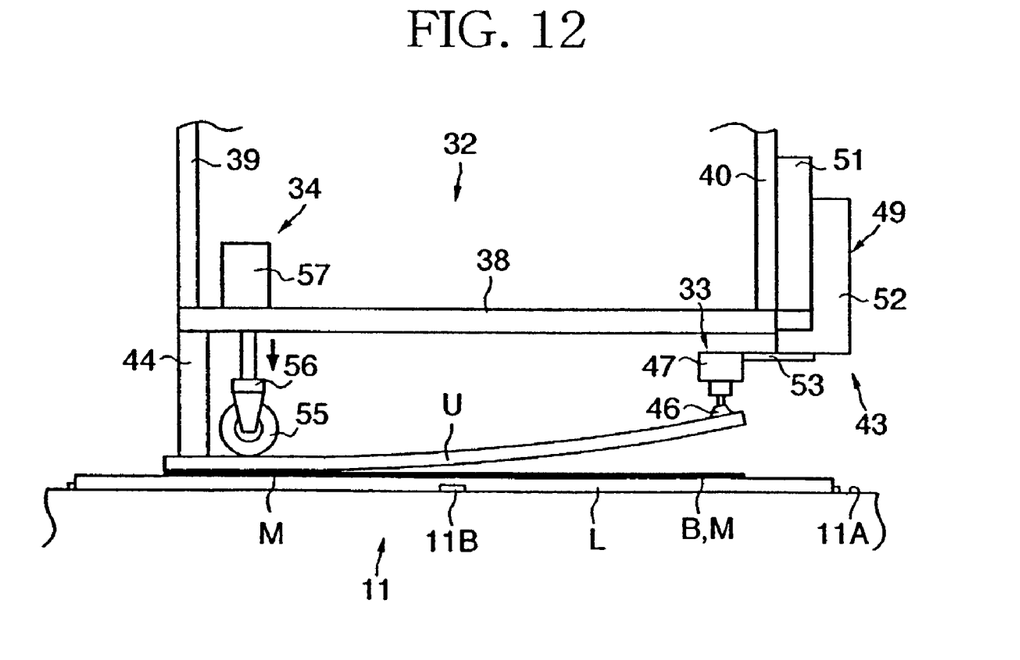
FIG. 12 is an enlarged front view of a main portion of the laminating apparatus showing a state where the outside of the sealing glass is pressed by a crimp roller.
Figure 13:
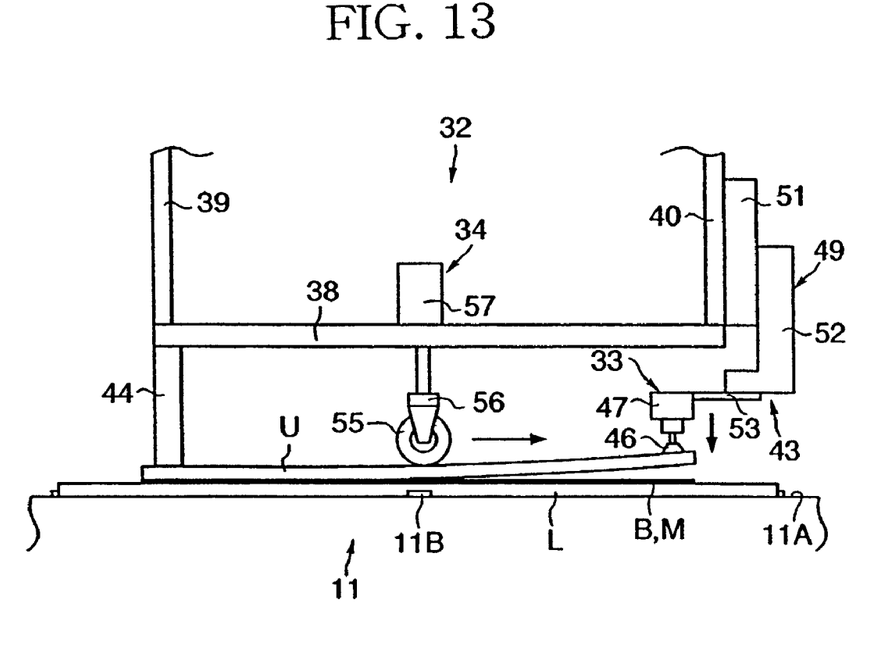
FIG. 13 is an enlarged front view of a main portion of the laminating apparatus showing a state where the crimp roller moves while pressing the sealing glass.

After that, as shown in FIG. 12, the cylinder 57 actuates in the state where the crimp roller 55 is located in the vicinity of the adsorbing block 44. Then, the crimp roller 55 descends so as to be in contact with the upper surface of the sealing glass U held by the adsorbing block 44 and the adsorbing pads 46, and provides a predetermined press force to the left end area of the sealing glass U. Subsequently, as shown in FIG. 13, the crimp roller 38 presses the sealing glass U against the device substrate L, and moves the area which it presses gradually to the right side. Thus, the sealing glass U is gradually laminated from the left side to the right side. At this time, the sealing glass U is laminated while the adsorbing pads 46 descends with respect to the adsorbing block 44 in accordance with the movement of the crimp roller 38, such that the bending angle of the sealing glass U is gradually decreased.

Figure 14:
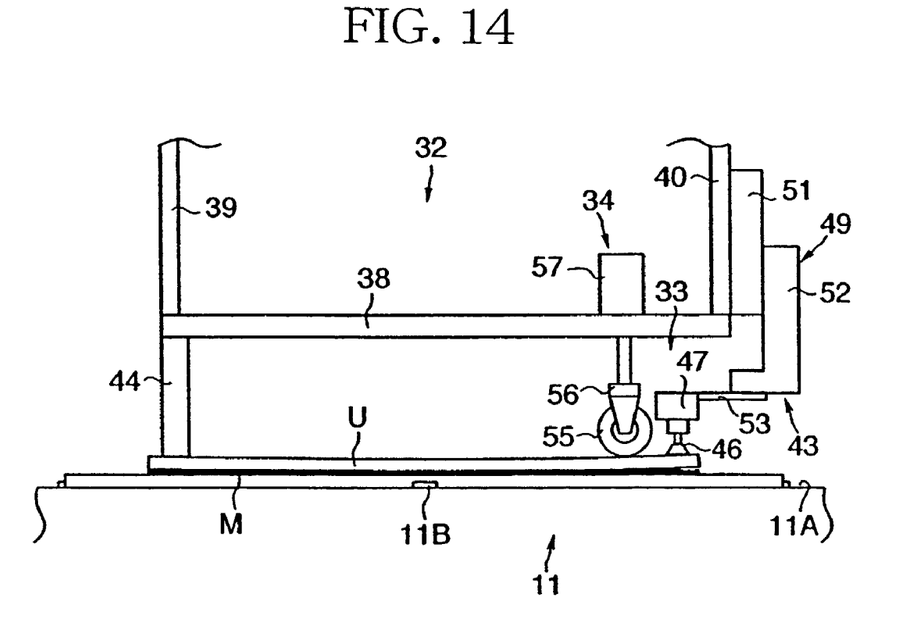
FIG. 14 is an enlarged front view of a main portion of the laminating apparatus showing a state where the crimp roller has moved to the adsorbing pads.
Figure 15:
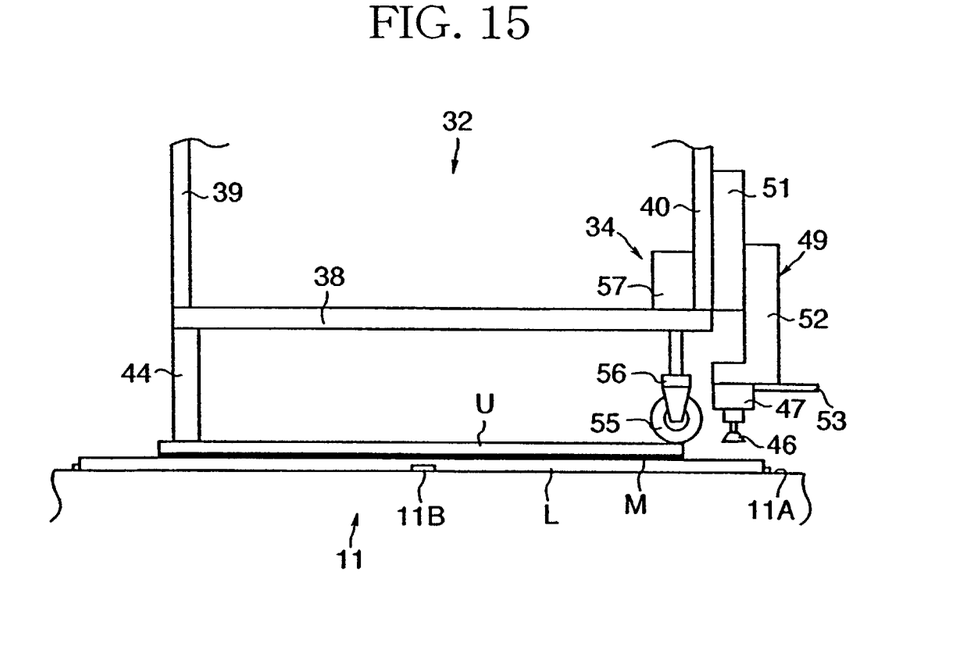
FIG. 15 is an enlarged front view of a main portion of the laminating apparatus showing a state where the crimp roller has moved to the end portion of the sealing glass.
Figure 16:
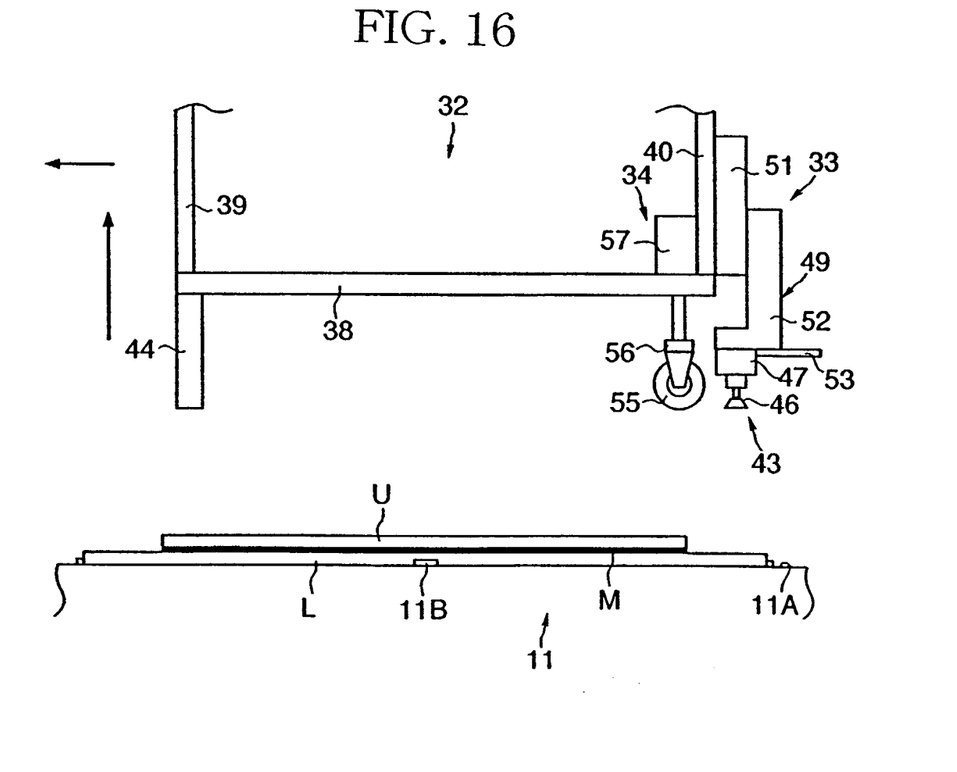
FIG. 16 is an enlarged front view of a main portion of the laminating apparatus showing a state where the lamination of the sealing glass is finished and the laminating means ascends.

After that, as shown in FIG. 14, when the crimp roller 55 reaches the right end of the sealing glass U, the sealing glass U is released from the adsorption by the adsorbing pads 46. Then, as shown in FIG. 15, the adsorbing pads 46 and the main body portion 47 move to the right side with respect to the crimp roller 55, so that the adsorbing pads 46 and the main body portion 47 escape to the outside of the sealing glass U. After that, the crimp roller 55 further moves to the right end of the sealing glass U, and the lamination of the sealing glass U is completed. When the lamination is completed, the sealing glass U is released from adsorption to the adsorbing block 44. Then, as shown in FIG. 16, the support member 32 as a whole moves in the left as ascending to stand-by at the initial position as shown in FIG. 2. The sealing glass U after lamination is irradiated with UV light emitted from the UV lamp 30 of the applying means 12 so as to cure the resin material M.

Figure 17:
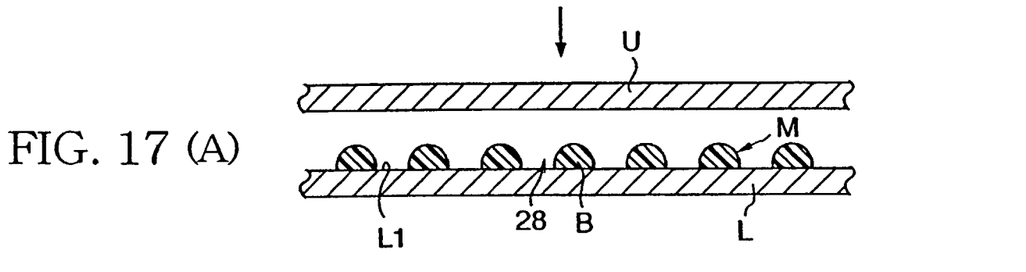
FIGS. 17(A) to (D) are cross-sectional views of a main portion in the direction orthogonal to the extending direction of the bead B showing the procedure of laminating the sealing glass to the device substrate.

According to the embodiment described above, as shown in FIG. 17(A), the resin material M is applied onto a plurality of portions on the device substrate L such that the beads B are formed at a predetermined interval. At the same time, as shown in FIG. 17(B), the beads B are formed in a shape of dome such that the bead B can be in substantially point-contact with the sealing glass U at a time of initial contact where the sealing glass U is brought into contact with the device substrate L for the first time. In this manner, the contact area between the resin material M and the sealing glass U is made small, thereby making the air difficult to remain between the resin material M and the sealing glass U. In addition, the air escape passage 28 is formed between each bead B, and the press force providing means 34 moves, while pressing the sealing glass U, along a direction in which the air escape passage 28 extends. Due to this structure, when the press force proving means 34 provides a predetermined laminating force between the device substrate L and the sealing glass U, as shown in FIG. 17(C), each bead B is pressed by the laminating force to be flattened. As each bead B is flattened, the air is expelled toward outside through the air escape passage 28, and as shown in FIG. 17(D), a thin film layer of the resin material M is formed such that the beads B are continuous between the sealing glass U and the device substrate L. As a result of this, the sealing glass U can be laminated onto the device substrate L without leaving any air bubbles between the device substrate L and the sealing glass U.

As described above, the organic electroluminescent device S formed by the laminating apparatus 10 contains no remaining air bubbles between the organic electroluminescent light emitting portion E and the sealing glass U. Therefore, accurate lamination can be achieved. Especially, as in the present embodiment, in the organic electroluminescent device S where the image display surface is located at the opposite side G of the glass substrate in the organic electroluminescent light emitting portion E, it is possible to protect the organic electroluminescent light emitting portion E without deteriorating the image quality on the image display surface.

In the above-described embodiment, the resin material M is applied onto the organic electroluminescent light emitting portion E, and after that, the sealing glass U is laminated onto the device substrate L. Contrarily, the resin material M may be applied onto the sealing glass U and then the device substrate L is laminated onto the sealing glass U.

In addition, the protective plate to be laminated onto the device substrate L onto which the resin material M is applied, any members made of resin plate and the like may be employed other than the sealing glass U described above, as far as they do not adversely affect the status of the organic electroluminescent device S.

Further, the bead B is not limited to the cross-sectional shape described in the above embodiments, but may have any other various kinds of cross-sectional shapes as far as it can prevent the air from entering between the sealing glass U and the device substrate S at the time of their initial contact. However, as curvature of the cross-section or flatness at the upper portion becomes larger, it is possible to reduce the contact area between the sealing glass U and the device substrate S at the time of their initial contact. This structure is further advantageous in preventing the air from entering therebetween.

In addition, in the above-describe embodiment, although the resin material M is applied onto a plurality of portions in a shape of a substantially straight line, the present invention is not limited to this. Alternatively, as far as the air escape passage can be formed, the resin material M may be applied to a plurality of portions on the device substrate L in any other forms such as wavy lines, spots, or broken lines or the like by use of a method such as screen printing and the like.

Further, in the above-described embodiment, although the laminating apparatus 10 is employed for laminating the organic electroluminescent light emitting portion E and the sealing glass U in the organic electroluminescent device S. The present invention, however, is not limited to this. The laminating apparatus 10 may be employed for laminating various kinds of members which are able to be laminated to each other. For example, the laminating apparatus 10 may be employed for laminating a protective plate to a light emitting body such as a liquid crystal display panel for protecting the light emitting portion of the light emitting body.

In addition, the respective constituent elements of the present invention are not limited to the structures described in the exemplary structures illustrated in the drawings, but various modifications thereof may be possible as far as they produce substantially the similar operations and effects as that described above.

As has been described above, according to the present invention, the resin material is applied to a plurality of portions such that the air escape passage is formed between the first and second members. When laminating force is provided along the air escape passage between the first and second members, the air is expelled toward outside through the air escape passage and the applied resin material becomes continuous so as to form a thin film layer. In this state, the first and second members are laminated to each other, and therefore, they can be laminated to each other without leaving any air bubbles therebetween.

In addition, since the applying means is capable of applying the resin material in a shape of bead at a predetermined interval and the air escape passage is formed between each bead, it is possible to prevent air bubbles from entering between the first and second members after they are laminated to each other through a relatively simple step of applying the resin material.

Further, each bead is kept in a shape of dome when viewed in the cross-sectional direction substantially orthogonal to the extending direction of the bead. The thus-shaped beads can be in substantially point-contact with the laminating surface of the other material at the time of initial contact therebetween. Therefore, at the time of initial contact between the first and second members, the contact area therebetween can be made small, thereby preventing the air from entering therebetween.

In addition, the laminating means is structured so as to move along the extending direction of the beads while pressing one member against the other member, and structured such that, in accordance with the movement, one member which is bent is gradually laminated from the base end side toward the free end side thereof onto the other member while the bending angle is changed. Due to this structure, the air remaining between the members can be reliably expelled toward outside.

What is claimed is:

1. A method of laminating first and second members to each other, said method comprising the steps of:
    depositing a resin material on at least said first member to form a plurality of spaced projections of said resin material and at least an air escape passage extending in a predetermined direction and between said spaced projections;
    disposing said members with said deposited resin material between the members;
    initially contacting a first end of the second member with the deposited resin material at a first end of the air escape passage, while bending a second, opposite end of the second member to be spaced away from the deposited resin material at a second, opposite end of the air escape passage; and
    applying a laminating force to said members to laminate said members progressively in said direction from said first end to said second end of the air escape passage, so that air is expelled from between said members through the air escape passage in said direction and the deposited resin material is caused to spread, fill said air escape passage, and form a continuous film layer between the members;

said method further comprising providing a suction mechanism having first and second suction elements;

holding the first and second ends of said second member with said first and second suction elements, respectively;

moving said first and second suction elements relative to each other to bend said second member prior to said contacting;

providing a roller; and moving said roller between said first and second suction elements to apply said laminating force.

2. The method of claim 1, wherein the laminating force is provided by an initial contact of the roller with the second member at a location between said first and second suction elements and by a subsequent movement of said roller towards the second suction element.

* * * * *